United States Patent
Wurster et al.

(10) Patent No.: US 12,522,069 B2
(45) Date of Patent: Jan. 13, 2026

(54) INFORMATION DISPLAY ON THE OUTSIDE OF A VEHICLE, AND METHOD FOR OPERATING A HINGED COVER IN THE FORM OF AN INFORMATION DISPLAY

(71) Applicant: Magna Exteriors GmbH, Sailauf (DE)

(72) Inventors: Michael Wurster, Esslingen (DE); Thomas Paule, Glattbach (DE)

(73) Assignee: Magna Exteriors GmbH, Sailauf (DE)

( * ) Notice: Subject to any disclaimer, the term of this patent is extended or adjusted under 35 U.S.C. 154(b) by 162 days.

(21) Appl. No.: 18/484,610

(22) Filed: Oct. 11, 2023

(65) Prior Publication Data
US 2024/0123824 A1   Apr. 18, 2024

(30) Foreign Application Priority Data
Oct. 13, 2022 (DE) ......................... 102022210827.2

(51) Int. Cl.
*B60K 35/00* (2024.01)
*B60K 35/22* (2024.01)
*B60K 35/28* (2024.01)

(52) U.S. Cl.
CPC ............ *B60K 35/00* (2013.01); *B60K 35/22* (2024.01); *B60K 35/28* (2024.01); *B60K 2360/167* (2024.01); *B60K 2360/33* (2024.01)

(58) Field of Classification Search
CPC ..................................................... B60K 35/00
See application file for complete search history.

(56) References Cited

U.S. PATENT DOCUMENTS

| | | | |
|---|---|---|---|
| 2010/0246198 A1 | 9/2010 | Hook et al. | |
| 2011/0043355 A1 | 2/2011 | Chander et al. | |
| 2022/0129948 A1* | 4/2022 | Cho | B60Q 1/507 |
| 2022/0305924 A1 | 9/2022 | Kwak et al. | |

FOREIGN PATENT DOCUMENTS

| | | | | |
|---|---|---|---|---|
| CN | 111086402 A | * | 5/2020 | ......... B60H 1/00971 |
| CN | 111086402 B | * | 3/2024 | ......... B60H 1/00971 |
| CN | 118481456 A | * | 8/2024 | |
| DE | 102011114075 A1 | | 6/2012 | |
| DE | 102011006476 A1 | | 10/2012 | |
| DE | 102014206034 A1 | | 10/2015 | |
| DE | 102014110084 A1 | | 1/2016 | |
| DE | 102017210946 A1 | | 1/2019 | |
| EP | 2628638 A2 | | 8/2013 | |
| EP | 3293033 A1 | * | 3/2018 | ................ B60L 1/14 |

OTHER PUBLICATIONS

NPL, Briggs & Stratton Recalls Portable Generator Fuel Tank Replacement Caps, Due to Fire Hazard, United States Consumer Product Safety Commission, (Oct. 10, 2018)( https://www.cpsc.gov/Recalls/2019/Briggs-Stratton-Recalls-Portable-Generator-Fuel-Tank-Replacement-Caps-Due-to-Fire-Hazard) (hereinafter "Briggs").*
Machine translation of Chinese Patent Application Pub. No. CN 111086402 B to Ichikawa that was filed in Aug. 16, 2019 (hereinafter "Ichikawa").*
Machine translation of European Patent Pub. No. EP3293033B1 to Brusco that was filed in 2017 (hereinafter "Brusco").*

* cited by examiner

*Primary Examiner* — Jean Paul Cass
(74) *Attorney, Agent, or Firm* — Dickinson Wright PLLC

(57) ABSTRACT

An information display on the outside of a vehicle, comprised of at least one illumination element or a display, which is overpainted with paint layers, wherein one of the paint layers has the car colour, and wherein a pattern in the form of holes or areas is produced in all the paint layers by ablation by means of a laser.

13 Claims, 3 Drawing Sheets

INFORMATION DISPLAY ON THE OUTSIDE OF A VEHICLE, AND METHOD FOR OPERATING A HINGED COVER IN THE FORM OF AN INFORMATION DISPLAY

CROSS-REFERENCE TO RELATED APPLICATIONS

This application claims priority to German Application No. DE 102022210827.2 filed Oct. 13, 2022. The entire disclosure of the above application is incorporated herein by reference.

FIELD OF THE INVENTION

The invention relates to an information display. For an information display on the outside of a vehicle, light is not used as a decorative effect, but changeable information relating to the vehicle or to traffic, or warning messages, etc. are to be displayed on the exterior surface of the vehicle or on a surface mounted externally on the vehicle. The invention relates also to a method for operating a hinged cover in the form of an information display.

BACKGROUND OF THE INVENTION

This section provides information related to the present disclosure which is not necessarily prior art.

When the display is not active, the display panel should if possible be invisible. The display can thus be seen only when required, and the design of the vehicle is not affected when the display is switched off.

Current transillumination concepts are limited to single colours, for example the colour black with a so-called black panel, as shown in FIGS. 1 and 2.

Such a solution is disclosed in DE 10 2014 110 084 A1. This document discloses an exterior surface which comprises an at least partially light-transmissive substrate having opposite first and second surfaces, an illumination source adjacent to the second surface of the substrate, and a variably light-transmissive layer on the first surface of the substrate, wherein the variably light-transmissive layer comprises a non-light-transmissive, opaque portion and a light-transmissive portion. The illumination source can be actuated between an illuminated state and a non-illuminated state, the exterior trim component is operative to receive information about at least a charge status of the battery. The light-transmissive portion defines visually perceptible indicia when is it back-lit by the illumination source in its illuminated state. When the illumination source is in its illuminated state, the visually perceptible indicia display at least a charge status of the battery.

DE 10 2011 006 476 A1 discloses a charging device having an interior, wherein the interior can be closed by means of a cover or a flap. A cover can, for example, be removed, that is to say detached, from the car body or can be mechanically connected to the car body. A flap is permanently connected to the electric vehicle in a folding manner, for example by way of a hinge. In the interior there are the electrical contacts of the charging device which are provided for charging and, in one embodiment, at least one illumination means with which the interior can be illuminated. The cover or flap is at least partially transparent in such a way that the light of the illumination means is also visible from the outside through the cover or flap. Alternatively or in addition, one or more illumination means, for example LEDs, that is to say light emitting diodes, can be arranged laterally adjacent to or around the cover or flap. Light emitted by the illumination means can then enter the cover in particular laterally, the cover then being configured inter alia to be correspondingly laterally transparent. By way of reflection, preferably by way of total reflection, light within the flap or cover is then able to reach a transparent region of the cover or flap, by way of which the light can then escape to the outside.

One problem with concealed displays is that a colour shift of the light occurs as a result of illumination through paints or coloured materials, so that, through the paint layer, light is visible to the observer in different wavelengths.

DE 10 2014 206 034 A1 discloses a component for a motor vehicle which consists of a film which has partially transparent regions and which is printed with a covering varnish. The cutouts are produced by screen printing. There is a coat of varnish which has openings which are produced by screen printing and not by the use of a laser.

DE 10 2011 114 075 A1 discloses a tank reservoir also for an electrically operated vehicle. The charge state can be displayed on the inside of the fuel filler flap when the flap is open.

DE 10 2011 006 476 A1 discloses a charging device for an electric vehicle, wherein the recess is illuminated and light shines through transparent regions of the fuel filler flap.

US 2011/0 043 355 A1 discloses a fuel filler flap with illumination without a display and a coat of paint.

SUMMARY OF THE INVENTION

This section provides a general summary of the disclosure, and is not a comprehensive disclosure of its full scope or all of its features.

An object of the invention is to provide an improved version in which the chosen wavelength is retained and having an information display in a hinged element of an electric charging device on the vehicle. A method for operating a hinged element having an information display is also to be disclosed.

The object is achieved by an information display on the outside of a vehicle, comprised of at least one illumination element or a display, which is overpainted with paint layers, wherein one of the paint layers has the car colour, and wherein a pattern in the form of holes or areas is produced in all the paint layers by ablation by means of a laser.

The invention allows information in very different designs and colours to be illuminated through a painted exterior component, wherein the displayed pattern is not dependent in its representation on the colour of the exterior component and is not influenced thereby.

One embodiment shows that the information display is a hinged cover for covering a charging socket of an electric vehicle.

The hinged cover can be or contain a display.

It is advantageous if the hinged cover has a mechanical and electrical connection to the opening to be concealed.

It is advantageous if the hinged cover contains at least one information display about the charge state or at least a representation of a brand name by way of the display.

The object is also achieved by a method for operating a hinged cover in the form of an information display in connection with the charging of an electric vehicle, comprising the steps:

initiating opening of the hinged cover by the driver or by a data link, activating the display or the illumination device of the hinged cover during opening and uncovering of an opening, and closing the hinged cover after a charging plug has been removed.

The method for operating a hinged cover also comprises: displaying a charge state when the hinged cover is open, and displaying further information, such as the number of kilometres available, the charging time, etc., on the hinged cover.

The method for operating a hinged cover comprises that illumination elements in the opening of the vehicle are activated when opening of the hinged cover is initiated.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DESCRIPTION OF THE INVENTION

There is proposed as an embodiment the display of vehicle traffic information on the outside of a vehicle in the regions painted in the car colour. The information is displayed only when required, which means that the regions in which the information is displayed are if possible invisible or are visible only with difficulty in the switched-off state.

Figure 1:
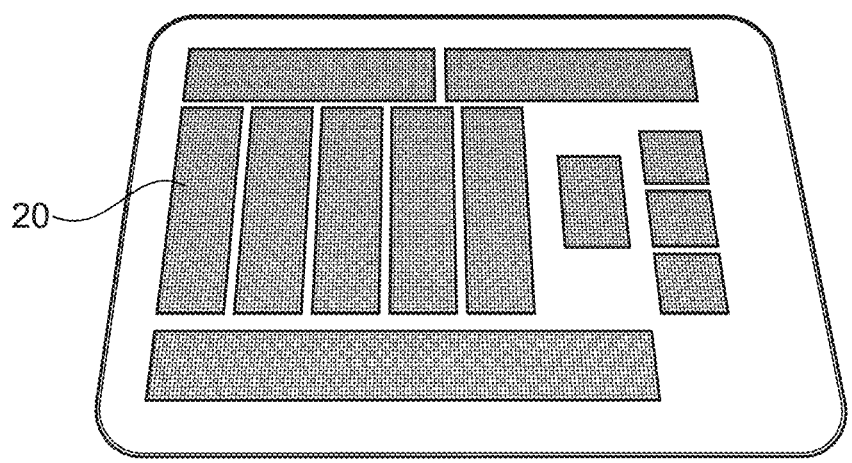
FIG. 1 shows an exemplary component in the prior art.
Figure 2:
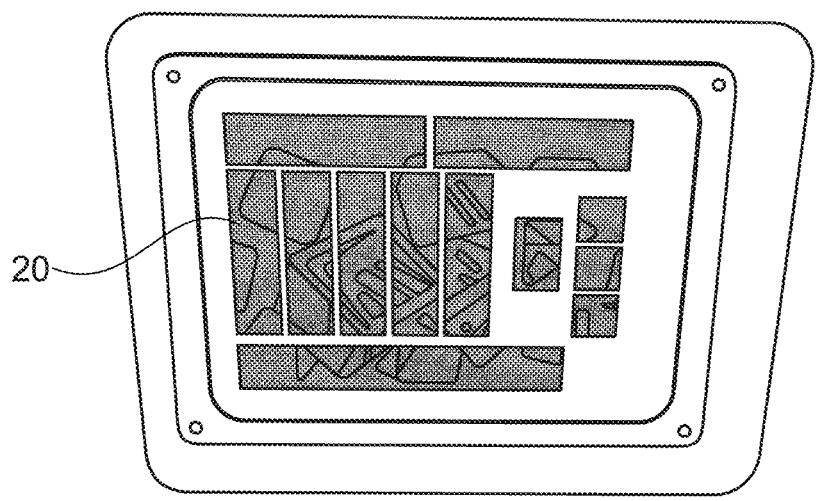
FIG. 2 shows the prior art component of FIG. 1 in the illuminated state.
Figure 3:
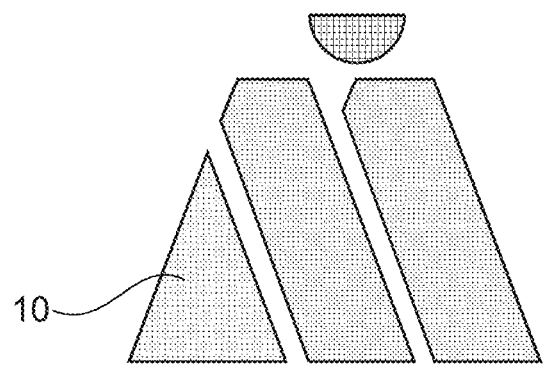
FIG. 3 shows a pattern produced by laser perforation.
Figure 4:
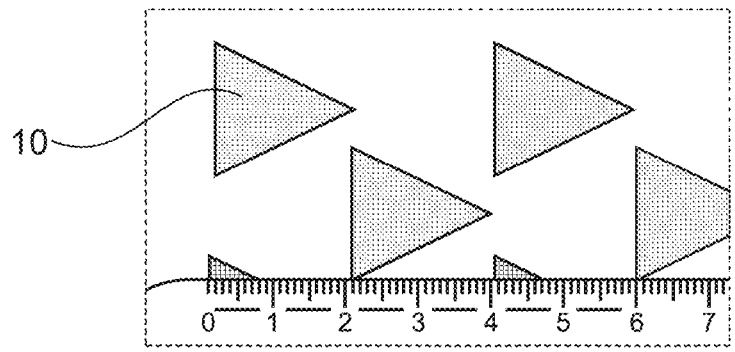
FIG. 4 shows a further pattern.
Figure 5:
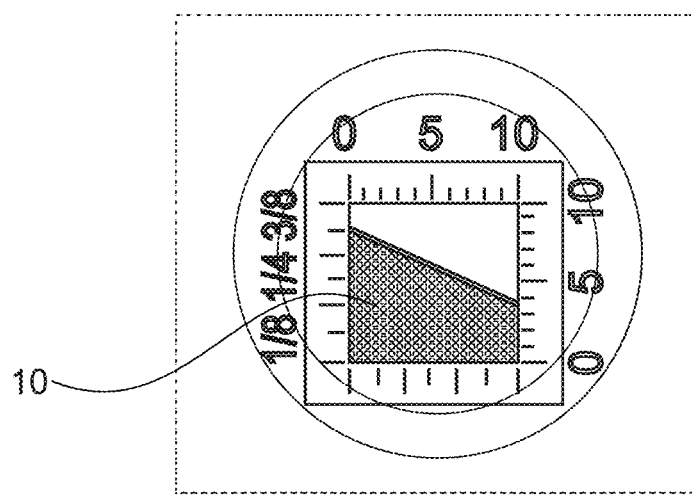
FIG. 5 shows the dimensioning of a surface treated with the laser.

The paint is rendered light-transmissive by laser ablation. Small regions of the paint are here removed in a pattern of holes, see FIGS. 3 and 4. The ablated holes 10 have a diameter of 100 µm (+/−50 µm), but may also be made larger in order to increase the light transmission. Such ablated holes are shown in FIG. 5, wherein the scale in mm is provided.

The visibility of the removal, as well as the light transmission, can be changed by the spacing of the individual holes 10 removed by ablation and the dot pattern itself. The substrate, the exterior component 20, to which the paint is applied is translucent or transparent material or a display, the surface of which naturally also consists of transparent material. If a display is used, this may also be installed into a larger exterior component 20.

The structure of the paint on the outside is optimized for the removal and consists of at least two layers S, but preferably of three layers S. The bottommost layer is applied to an exterior component of the vehicle and forms a light-tight layer for preventing any undesirable transmission, namely glimpses of the exterior component. If this layer is already coloured in the car colour, a further layer of base coat paint for colouring can be omitted.

Generally, however, this first layer is a primer, to which a base coat paint for colouring is then applied as a second layer. In addition, a layer of transparent paint can then already be applied for sealing.

After these layers have been applied, the laser removal is carried out through all the layers, and the component is then again coated with a layer of transparent/translucent clear paint in order to protect also the lasered regions.

The pattern of removal can be arranged in very different forms, so that, for example, digital numbers, letters, fill level bars, logos or the like can be displayed.

In addition to point-wise removal, the paint can also be removed extensively in order to achieve increased transmission and better visibility of the information displayed on the light source/display or in order to give prominence to certain regions. Compared to point-wise removal, extensive removal is also visible from the outside in the switched-off state.

Conceivable light sources are LEDs, micro LEDs, OLEDs and displays of all possible types. For the above-defined representation it is additionally possible, by means of masking, to separate the illuminated regions from one another and achieve a sharper representation.

FIGS. 6 to 9 show an exemplary embodiment in different stages of a method.

There has been chosen, as the exemplary embodiment, a flap which closes an electrical socket for an electrified vehicle. The flap, in the form of a conventional fuel filler flap, has a hinged cover 2 which closes an opening 3 in the exterior of the vehicle 1. The flap is a plastics component 5, which contains a display 6 to which the layers S of the paintwork which have already been described above have been applied. Alternatively, the display 6 is installed behind a transparent plastics component 5 in the form of the flap, to which the layers of paint have been applied. The plastics component 5 also serves to fasten the mechanical components 4 of the hinged cover 2.

Ablations with ablated holes 10 have also already been introduced into the desired regions of the surface 7 of the hinged cover, so that it is possible for light to shine through.

The hinged cover 2 is preferably opened electrically. The hinged cover can be operated in different ways. The driver of the vehicle can actively open the hinged cover 2 by operating a switch from the inside or by remote control.

Alternatively, the hinged cover can be opened when the vehicle is parked at a charging point and a data exchange takes place.

The hinged cover 2 is shifted and pivoted either upwards or to the side.

The activation of the hinged cover 2 and the mechanical form of the linkage for pivoting are not important. The hinged cover 2 is not only connected mechanically to the opening 3 but is also contacted with the opening 3 electrically.

Figure 6:
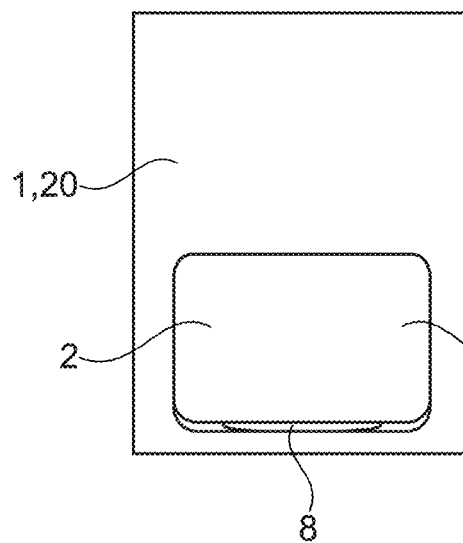
FIG. 6 to FIG. 9 show an exemplary embodiment of a charging flap in different states of the method.
Figure 7:
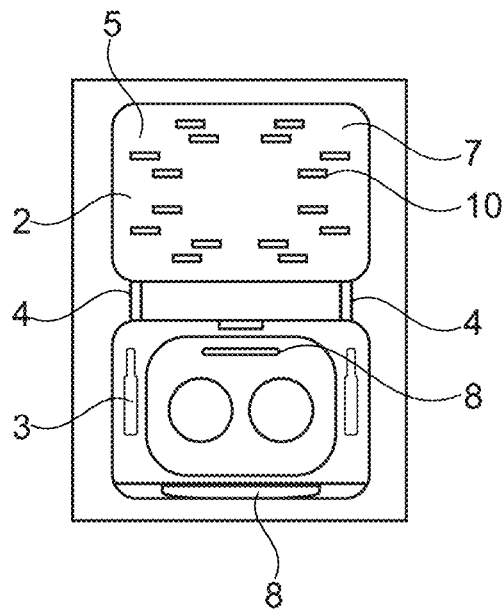
Figure 8:
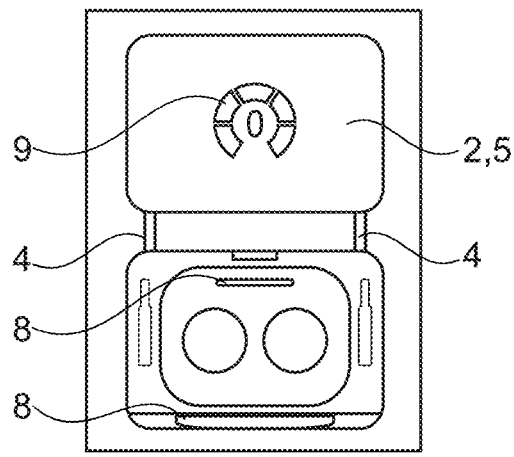

On operation or on receiving the command to open the flap, LEDs or other illumination elements 8 in the opening 3 are activated. As is shown in FIG. 6, these LEDs shine through at the edges even when the hinged cover 2 is closed. Otherwise, the exemplary illumination elements 8 in the opening 3 mark the lower and upper boundaries of the opening.

While the hinged cover 2 is slowly opening, the display 6 in the hinged cover 2 is activated and patterns, in this case horizontal lines, appear on the surface 7 of the hinged cover. These patterns can be configured as desired and can also include brand marks.

By activating the display 6 it is possible, for example, to slowly make a brand mark partially appear, to switch multiple brand marks on and off, or to arrange and display multiple brand marks differently over the entire surface and make them flash.

If the hinged cover 2 is fully open, the charge state is displayed on the display 6 and thus on the surface 7 of the hinged cover 2.

In the exemplary embodiment, a partial circle with different segments 9 is shown, which segments represent the charge state and can be displayed in a single colour or also in multiple colours.

Figure 9:
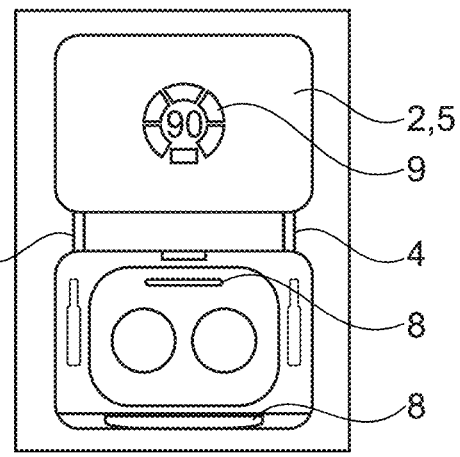

In FIG. 9, the display of the charge state on the hinged cover can be seen, as is present, for example, after a charging process and after the electrical plug has been removed.

There can be seen in the partial circle with the segments 9 a number, which shows the charge state in percent. Further information for the driver of the vehicle is likewise available. Such information is, for example, a displayed range and the charge time, etc.

The exemplary embodiment requires special laser ablations, which are adapted to the information to be displayed.

It is thus necessary, if it is desired to display patterns distributed over the entire surface, that the individual part-regions are exposed by means of a laser. When displaying the charge state and further information in the centre of the hinged cover 2, extensive perforation of the paint layers may be expedient.

On completion of the charging process, removal of the charging cable or operation of a switch or a remote control, the method is terminated and the hinged cover is slowly returned to the covering position again.

The display 6 on the hinged cover 2 is extinguished, and the illumination elements 8 are switched off as soon as the hinged cover 2 is fully closed.

What is claimed is:

1. An information display on the outside of a vehicle, the information display comprising:
    at least one display panel, wherein the at least one display panel is overpainted with paint layers, wherein the at least one display panel is illuminable,
    wherein the at least one display panel is attached to an exterior of the vehicle, wherein the vehicle has a vehicle color,
    wherein one of the paint layers corresponds to the vehicle color, and
    wherein a pattern in the form of ablation holes is formed in all of the paint layers by laser ablation,
    wherein the information display is in the form of a hinged cover, wherein the hinged cover has a closed position that covers a charging socket of the vehicle, wherein the vehicle is an electric vehicle, and
    wherein the hinged cover includes the display panel, wherein patterns and information are displayed on a surface of the hinged cover by activating the display panel,
    wherein, when the display panel is activated and illuminated, the patterns and information are visible through the paint layers via the ablation holes,
    wherein, when the display panel is de-activated and not illuminated, the patterns and information are not visible.

2. The information display according to claim 1, wherein the hinged cover has a mechanical and electrical connection to an opening to be concealed, wherein the opening includes the charging socket.

3. The information display according to claim 1, wherein the display panel displays information about the charge state when activated.

4. The information display according to claim 1, wherein the display panel displays a representation of a brand mark when activated.

5. A method for operating a hinged cover having an information display including a display panel in connection with the charging of an electric vehicle, comprising:
    initiating opening of the hinged cover by the driver or by a data link;
    automatically activating the display panel and illuminating a pattern on the display panel in response to opening the hinged cover and uncovering of an opening, wherein the opening includes a charging socket therein; and
    automatically closing the hinged cover after a charging plug has been removed;
    wherein the display panel is overpainted with paint layers, wherein a plurality of ablation holes are formed through the paint layers,
    wherein the pattern is visible through the pain layers when the display is activated and illuminated,
    wherein the pattern is not visible through the paint layers when the display is not activated and not illuminated.

6. The method of claim 5, further comprising the steps of:
    displaying a charge state when the hinged cover is open and the display panel is activated and illuminated.

7. The method of claim 5, wherein illumination elements disposed in the opening of the vehicle are activated in response initiating opening of the hinged cover.

8. The method of claim 5, wherein the hinged cover has a mechanical and electrical connection to the opening covered by the hinged cover.

9. The information display of claim 1, wherein the ablation holes have a diameter of 50-150 μm.

10. The information display of claim 1, wherein the ablation holes are arranged in a dot pattern.

11. The information display of claim 10, wherein the dot pattern corresponds to the patterns and information that are displayed when the display panel is activated and illuminated.

12. The information display of claim 1, wherein a light color of the display panel when activated is visible through the paint layer.

13. The information display of claim 1, wherein an additional opening is defined in the paint layers, wherein a portion of the display panel is exposed through the additional opening and visible both when the display panel is activated and deactivated.

* * * * *